US010091652B2

(12) United States Patent
Polak et al.

(10) Patent No.: US 10,091,652 B2
(45) Date of Patent: *Oct. 2, 2018

(54) RELAY DEVICE

(71) Applicant: NXP B.V., Eindhoven (NL)

(72) Inventors: Piotr Polak, Eindhoven (NL); Jan René Brands, Eindhoven (NL)

(73) Assignee: NXP B.V., Eindhoven (NL)

( * ) Notice: Subject to any disclaimer, the term of this patent is extended or adjusted under 35 U.S.C. 154(b) by 111 days.

This patent is subject to a terminal disclaimer.

(21) Appl. No.: 15/201,355

(22) Filed: Jul. 1, 2016

(65) Prior Publication Data

US 2017/0013457 A1 Jan. 12, 2017

(30) Foreign Application Priority Data

Jul. 7, 2015 (EP) .................................... 15175741

(51) Int. Cl.
| | |
|---|---|
| *H04L 29/06* | (2006.01) |
| *H04W 12/06* | (2009.01) |
| *H04W 4/80* | (2018.01) |
| *G06Q 20/32* | (2012.01) |
| *G06Q 20/36* | (2012.01) |

(Continued)

(52) U.S. Cl.
CPC .......... *H04W 12/06* (2013.01); *G06Q 20/327* (2013.01); *G06Q 20/3224* (2013.01); *G06Q 20/3278* (2013.01); *G06Q 20/3674* (2013.01); *H04B 5/0031* (2013.01); *H04B 5/0075* (2013.01); *H04L 63/0492* (2013.01); *H04L 63/08* (2013.01); *H04W 4/80* (2018.02); *H04W 12/08* (2013.01)

(58) Field of Classification Search
CPC .................................................. H04L 63/0492
USPC ............................................................ 726/4
See application file for complete search history.

(56) References Cited

U.S. PATENT DOCUMENTS

| | | |
|---|---|---|
| 8,500,031 B2 | 8/2013 | Naelon |
| 8,880,055 B1 | 11/2014 | Clement et al. |

(Continued)

OTHER PUBLICATIONS

Extended European Search Report for Patent Appln. No. 15175741.6 (dated Oct. 7, 2015).

(Continued)

*Primary Examiner* — Longbit Chai (57) ABSTRACT

According to a first aspect of the present disclosure, a relay device for use in near field communication (NFC) transactions is provided, said relay device comprising a communication unit, wherein said communication unit comprises an NFC controller and a wireless communication controller which are operatively connected to each other through a physical interface, said NFC controller being arranged to establish communication with an NFC-enabled device that is external to the relay device, and said wireless communication controller being arranged to establish communication with a wireless device that is external to the relay device, wherein the communication unit is arranged to relay transaction data between the NFC-enabled device and the wireless device. According to a second aspect of the present disclosure, a corresponding method for facilitating near field communication (NFC) transactions is conceived. According to a third aspect of the present disclosure, a corresponding non-transitory, tangible computer program product is provided.

14 Claims, 3 Drawing Sheets

(51) Int. Cl.
*H04B 5/00* (2006.01)
*H04W 12/08* (2009.01)

(56) References Cited

U.S. PATENT DOCUMENTS

| | | | | |
|---|---|---|---|---|
| 2002/0004770 | A1* | 1/2002 | Phillips | G06Q 20/102 705/34 |
| 2013/0207778 | A1 | 8/2013 | Neafsey et al. | |
| 2014/0282878 | A1 | 9/2014 | Ignatchenko et al. | |
| 2014/0291392 | A1 | 10/2014 | Teuwen et al. | |
| 2014/0357201 | A1* | 12/2014 | Misumi | H04B 1/401 455/78 |
| 2015/0039494 | A1* | 2/2015 | Sinton | G06Q 20/327 705/39 |
| 2015/0081539 | A1 | 3/2015 | Mizuno et al. | |
| 2016/0127859 | A1 | 5/2016 | Brands | |

OTHER PUBLICATIONS

"Single Chip, Dual-Band (2.4 GHz / 5 GHz) 802.11 G/N MAC/Baseband/Radio With Integrated Bluetooth 4.0, NFC + FM Receiver", Internet Archive, Broadcom, 1 pg, retrieved from the internet Jun. 30, 2016 at: https://web.archive.org/web/20140331071604/http://www.broadcom.com/products/NFC/NFC-Solutions/BCM43341 (Mar. 31, 2014).

"Watch 2 Pay", Internet Archive, 1 pg, retrieved from the internet Jun. 3, 2016 at: https://web.archive.org/web/20140301142419im_/http://watch2pay.com/projects/V4SC39PL-1UPO-E8QV-XBPS-X4NVDTDY5O11/images/content/sujets/AZNGIMT3-QHQG-JVFX-4XBA-SAV7NCRFRETA.jpg (Mar. 1, 2014).

"Host card emulation", Internet Archive, Wikipedia, 3 pgs, retrieved from the internet Jun. 30, 2016 at: https://web.archive.org/web/20140403120718/http://en.wikipedia.org/wiki/Host_card_emulation (Feb. 28, 2014).

"NFC Frequency Asked Questions", Internet Archive, Smart Card Alliance, 3 pgs, retrieved from the internet at Jun. 30, 2016: https://web.archive.org/web/20140419091757/http://www.smartcardalliance.org/pages/publications-nfc-frequently-asked-questions (Apr. 19, 2014).

"GlobalPlatform made simple guide: Secure Element", GlobalPlatform, 2 pgs, retrieve from the internet Jun. 3, 2016: https://web.archive.org/web/20140812084146/http://www.globalplatform.org/mediaguideSE.asp (Aug. 12, 2014).

* cited by examiner

RELAY DEVICE

CROSS-REFERENCE TO RELATED APPLICATIONS

This application claims the priority under 35 U.S.C. § 119 of European patent application no. 15175741.6, filed on Jul. 7, 2015, the contents of which are incorporated by reference herein.

FIELD

The present disclosure relates to a relay device for use in near field communication (NFC) transactions. Furthermore, the present disclosure relates to a transaction system comprising such a relay device, to a method for facilitating NFC transactions, and to a corresponding non-transitory, tangible computer program product.

BACKGROUND

Today, security plays an important role in many electronic devices and computing environments. For example, conventional mobile electronic devices may be used for payment transactions, or other transactions, which involve the exchange of sensitive transaction data with terminal devices. Such mobile electronic devices may for instance be equipped with a near field communication (NFC) interface based on radio frequency (RF) technology, in order to exchange said transaction data with a terminal device at a point-of-sale (POS). Traditionally, sensitive transaction data have been incorporated into dedicated security tokens such as smart cards, in which the data are inherently confined to a relatively trusted environment. With the advent of integrated solutions, in particular the integration of so-called secure elements (SEs) in consumer devices, transaction data have increasingly been incorporated into such secure elements. Alternatively, so-called emulated cards embedded in consumer devices have often been used for accommodating transaction data. As mentioned above, the card or the consumer device, as the case may be, exchanges the transaction data with a terminal device at a POS.

SUMMARY

According to a first aspect of the present disclosure, a relay device for use in near field communication (NFC) transactions is provided, said relay device comprising a communication unit, wherein said communication unit comprises an NFC controller and a wireless communication controller which are operatively connected to each other through a physical interface, said NFC controller being arranged to establish communication with an NFC-enabled device that is external to the relay device, and said wireless communication controller being arranged to establish communication with a wireless device that is external to the relay device, wherein the communication unit is arranged to relay transaction data between the NFC-enabled device and the wireless device.

In one or more embodiments, the physical interface is isolated from other components of the relay device.

In one or more embodiments, the communication unit is a single integrated circuit comprising the NFC controller and the wireless communication controller.

In one or more embodiments, the wireless communication controller is a Bluetooth communication controller.

In one or more embodiments, the relay device further comprises an authentication module for authenticating the relay device to the wireless device.

In one or more embodiments, the relay device is arranged to exchange authentication credentials with the wireless device through the NFC controller.

In one or more embodiments, the relay device is arranged to add an authentication code to the transaction data.

In one or more embodiments, the NFC controller is arranged to send waiting-time extension requests to the NFC-enabled device.

In one or more embodiments, the relay device is at least one of a wearable device and a smart watch.

In one or more embodiments, a transaction system comprises a relay device of the kind set forth and a wireless device.

In one or more embodiments, the wireless device comprises a secure element for storing and processing the transaction data.

In one or more embodiments, the wireless device comprises a further communication unit, said further communication unit comprising a further NFC controller which is operatively connected to the secure element, and a further wireless communication controller which is operatively connected to the further NFC controller.

In one or more embodiments, the wireless device is arranged to exchange authentication credentials with the relay device through the further NFC controller.

According to a second aspect of the present disclosure, a method for facilitating near field communication (NFC) transactions is conceived, the method comprising: establishing, by a communication unit in a relay device, communication with an NFC-enabled device, which is external to the relay device, through an NFC controller comprised in said communication unit; establishing, by the communication unit, communication with a wireless device, which is external to the relay device, through a wireless communication controller comprised in said integrated circuit, wherein the wireless communication controller is operatively connected to the NFC controller through a physical interface; relaying, by the communication unit, transaction data between the NFC-enabled device and the wireless device.

According to a third aspect of the present disclosure, a non-transitory, tangible computer program product is provided, the computer program product comprising instructions which, when being executed by a processing unit, cause said processing unit to carry out or control a method of the kind set forth.

DESCRIPTION OF DRAWINGS

Embodiments will be described in more detail with reference to the appended drawings, in which.

DESCRIPTION OF EMBODIMENTS

Figure 1:
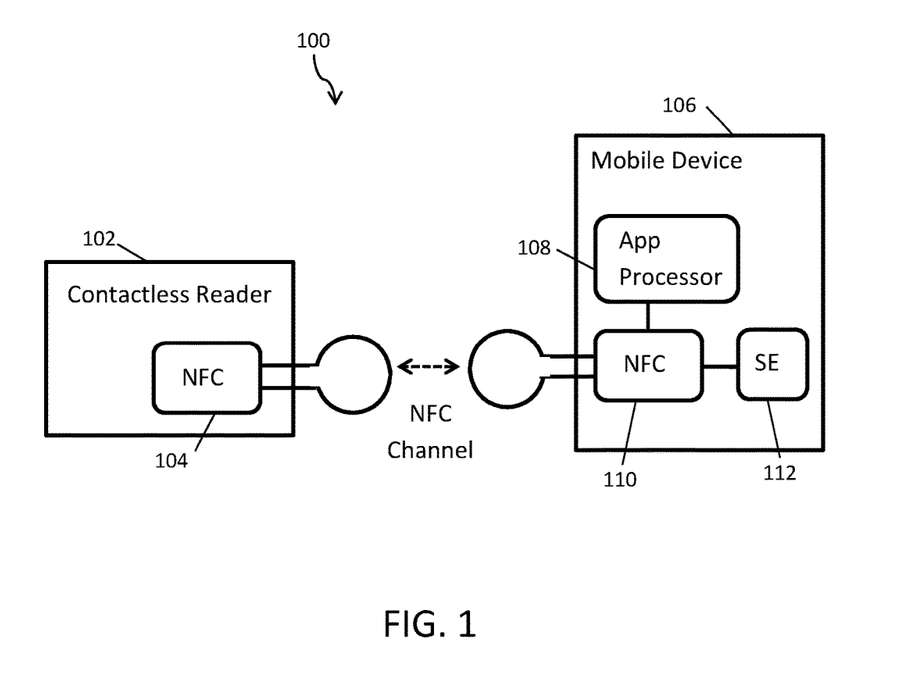
FIG. 1 shows an example of a transaction system.

FIG. 1 shows an example of a transaction system 100. The system 100 comprises a contactless reader 102, which may, for example, function as a terminal device at a point-of-sale (POS). The system 100 also comprises a mobile device 106, for instance a smart phone, which may communicate contactlessly with the contactless reader 102. To this end, the mobile device 106 comprises an NFC device 110 and the contactless reader 102 comprises an NFC device 104. In operation, an NFC channel may be established between these NFC devices 104, 110. The NFC device 104, 110 may be NFC controller chips, examples of which are commonly available on the market. The mobile device 106 further comprises an application processor 108 which is operatively connected to the NFC device 110, and a secure element 112 which is operatively connected to the NFC device 110. The secure element 112 may be implemented as an embedded chip, more specifically as a tamper-resistant integrated circuit with installed or pre-installed smart-card-grade applications, for instance payment applications, which have a prescribed functionality and a prescribed level of security. Furthermore, the secure element 112 may implement security functions, such as cryptographic functions and authentication functions.

Although the mobile device 106 can be used to carry out NFC transactions, such as direct payment transactions in shops or passenger fare transactions in public transport, it can still be inconvenient and potentially unsafe to have to take the mobile device 106 out of the pocket in public, for example in a metro station or on the street. The mobile device 106 may, for example, be an expensive smart phone which easily can be stolen. Therefore, it has been proposed to use wearable devices, such as smart watches which are more fixed to the human body and consequently less susceptible to theft, for carrying out NFC transactions with terminal devices.

However, there may be wearable devices, such as smart watches, which are not equipped with secure elements of the kind set forth. It is already complicated enough in practice to manage secure elements on mobile devices such as smart phones. The management of access control and applet installation, for instance, already involves a number of (sometimes even competing) parties, such as a device manufacturer, an operating-system vendor and a mobile network operator (MNO). This has the effect that the full potential of the relatively expensive secure element is usually not fully realized. In view thereof, it may be expected that the same would be true in case of a secure element in a different device, which makes it rather unlikely that the integration of a secure element in a wearable device will take place on a large scale, even though it is technically possible. An additional challenge is that while applications installed in secure elements in mobile devices are usually managed remotely over-the-air (OTA), this would not always be possible, or at least be more complicated, in case of a wearable device.

In order to avoid these problems, it would be possible to integrate an NFC controller, which is able to do host card Emulation (HCE) into a wearable device and have it function as a proxy of a secure element in a mobile device by having an application (e.g., a so-called "app") on the mobile device access the secure element. By sending requests from the contactless reader, received via HCE on the wearable device and transmitted via a wireless communication channel (e.g., via a Bluetooth communication channel in accordance with the IEEE 802.15.1 standard) to the mobile device, via the app to the secure element and sending the responses from the secure element via the same route back to the contactless reader, one can set up a connection between the contactless reader and the mobile device's secure element. Thus, the wearable device effectively functions as a relay device for relaying transaction data between the contactless reader and the mobile device.

Although this could work in practice, the security provided by the secure element would be lost or weakened. That is to say, if transaction data for the secure element is exchanged between the mobile device and the wearable device via a wireless communication channel that is not an NFC channel, it may be possible for malicious software in the mobile device to intercept and/or manipulate these data. It may also become possible that other (potentially hostile) devices access the secure element via the same wireless technology as used for the link with the wearable device. Another way to attack the secure element could be through malicious applications on the wearable device, using the existing link to the secure element through the mobile device. Hence, there may exist a need to mitigate these security risks.

In accordance with the present disclosure, therefore, a relay device for use in near field communication (NFC) transactions is provided. Said relay device comprises a communication unit, which comprises an NFC controller and a wireless communication controller which are operatively connected to each other through a physical interface. The NFC controller is arranged to establish communication with an NFC-enabled device that is external to the relay device. Furthermore, the wireless communication controller is arranged to establish communication with a wireless device that is external to the relay device. Thus, the communication unit is arranged to relay transaction data between the NFC-enabled device and the wireless device. The NFC-enabled device may be a contactless reader, for example. The wireless device may be a mobile device, such as a smart phone or a tablet.

In order to mitigate the above-mentioned security risks, the NFC controller and the wireless communication controller are integrated in a single communication unit in the relay device. This communication unit may, for example, be a single integrated circuit (i.e., a combo IC) having integrated thereon controllers for different communication technologies. In this communication unit, the wireless communication controller may exchange transaction data directly with the NFC controller. In particular, the physical interface between the NFC controller and the wireless communication controller may be isolated from other components (e.g., from an application processor) of the relay device. That is to say, since the communication unit is a separate component in the relay device, it may interact with other components (e.g., the application processor) through input/output interfaces, for example, while preventing said other components from accessing the physical interface between the NFC controller and the wireless communication controller. Thus, the probability that the transaction data are intercepted and/or manipulated by these other components is reduced.

Figure 2:
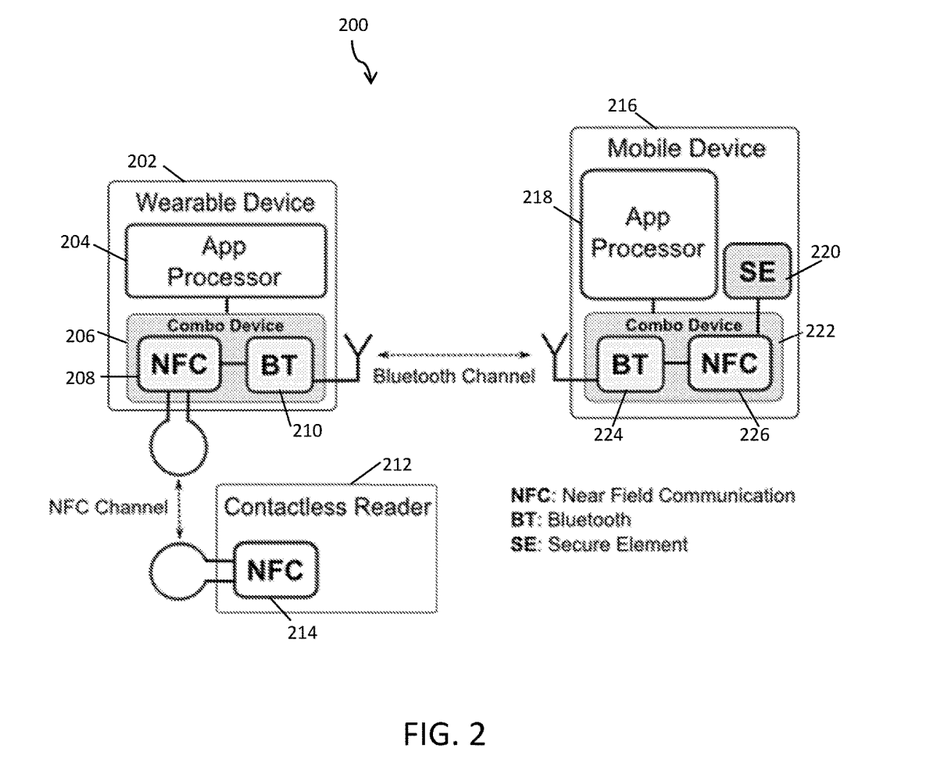
FIG. 2 shows an illustrative embodiment of a transaction system.

FIG. 2 shows an illustrative embodiment of a transaction system 200. The system 200 comprises a relay device 202, in particular a wearable device, which comprises an application processor 204 and a combo device 206 (i.e., a combo IC). The application processor 204 may be any kind of processing unit for performing computational tasks, in particular for executing computer programs or applications, for example a central processing unit or a microprocessor. The combo device 206 comprises an NFC controller 208 and a wireless communication controller 210, in particular a Bluetooth communication controller, which are operatively connected to each other through a physical interface. Furthermore, the system 200 comprises a contactless reader 212. The contactless reader 212 comprises an NFC device 214. In operation, an NFC channel may be established between the NFC controller 208 of the relay device 202 and the NFC device 214 of the contactless reader 212. Furthermore, the system 200 comprises a wireless device 216, in particular a mobile device. The wireless device 216 comprises an application processor 218, a combo device 222 (i.e., a combo IC) operatively connected to the application processor 218, and a secure element 220 operatively connected to an NFC controller 226 of the combo device 222. The application processor 218 may be any kind of processing unit for performing computational tasks, in particular for executing computer programs or applications, for example a central processing unit or a microprocessor. The combo device 222 comprises said NFC controller 226 and a wireless communication controller 224, in particular a Bluetooth communication controller, which is operatively connected to the NFC controller 226. In operation, a wireless communication channel (in particular a Bluetooth communication channel) may be established between the wireless communication controller 210 of the relay device 202 and the wireless communication controller 224 of the wireless device 216. The secure element 220 may be implemented as an embedded chip, more specifically as a tamper-resistant integrated circuit with installed or pre-installed smart-card-grade applications, for instance payment applications, which have a prescribed functionality and a prescribed level of security. Furthermore, the secure element 220 may implement security functions, such as cryptographic functions and authentication functions. Alternatively, but without limitation, the secure element 220 may be implemented as a virtual secure element, for example as an emulated secure element (i.e., an emulated card) based on host card emulation (HCE) technology.

Thus, in one or more embodiments, the wireless device 216 also comprises a combo device 222 with an integrated NFC controller 226 and a wireless communication controller 224 which are operatively connected to each other. In other words, the wireless device 216 comprises a further communication unit 222, said further communication unit 222 comprising a further NFC controller 226 which is operatively connected to the secure element 220 of the wireless device 216, and a further wireless communication controller 224 which is operatively connected to the further NFC controller 226. The further communication unit 222 may, for example, be a single integrated circuit (i.e., a combo IC). In this way, the probability that transaction data are intercepted and/or manipulated by other components of the wireless device 216 is reduced. Thus, a relatively isolated communication channel may be established for the exchange of transaction data between the contactless reader 212 and the secure element 220 of the wireless device 216.

Furthermore, in one or more embodiments, the relay device 202 comprises an authentication module (not shown) for authenticating the relay device 202 to the wireless device 216. The use of such an authentication module enables an easy, yet effective, mechanism to prevent that unauthorized relay devices access the secure element 220. In particular, the authentication of the relay device 202 to the wireless device 216 by means of said module may be an additional step in the normal pairing procedure between wireless devices. Most Bluetooth-enabled mobile devices, for example, can only set up connections after explicit user confirmation (e.g., after touching an "OK" button displayed on the screen). However, in order to prevent a scenario wherein an attacker tricks a user into confirming a connection set-up request from a malicious device, more may be needed than only a simple confirmation. In practice, Bluetooth security may offer limited security. By equipping relay devices with an authentication module, only specific relay devices can connect, upon or after successful authentication using a simple, dedicated built-in piece of security hardware. The authentication module may be an authentication chip containing authentication credentials that may be verified by the wireless device 216.

Alternatively or in addition, the relay device 202 may be arranged to exchange authentication credentials with the wireless device 216 through the NFC controller 208. These authentication credentials may be alternative or complementary to the authentication credentials contained in the authentication module. It may be envisaged, for example, that the relay device 202 is brought into close proximity of the wireless device 216 in order to set up an NFC-based Bluetooth pairing procedure between the relay device 202 and the wireless device 216. During said pairing procedure, authentication credentials may be exchanged between the wireless device 216 and the relay device 202 through an NFC channel (not shown) between the NFC controllers 208 and 226. Said credentials may be used in a mutual authentication procedure, for example.

It is noted that the pairing procedure may preferably be triggered by the wireless device 216, because the secure element 220 is the asset that should be protected. By touching it to the relay device 202 device, pairing data, such as a Bluetooth media access control address and an authentication key, can be transferred (optionally after verifying, for example using the above-mentioned authentication module, that the relay device 202 is a piece of hardware that is authentic and can be trusted). The pairing data may be generated by the Bluetooth controller 224, such that the application processor 218 (and any apps running on it) will not have access to them and consequently cannot steal them. If the procedure succeeds, the user may get a confirmation message on the wireless device 216 and/or on the relay device 202 to indicate that the relay device 202 is paired and has access to the secure element 220.

Furthermore, in one or more embodiments, the relay device 202 is arranged to add an authentication code to the transaction data. This is useful because it may provide a form of protection of the wireless communication channel between the relay device 202 and the wireless device 216. In particular, it may be important that the secure element 220 only responds to commands that originate from the contactless reader 212 with which the relay device 202 is actually communicating. If that were not the case, an attacker might inject extra commands into the wireless communication channel and use the secure element's response for a malicious purpose. In order to prevent such an attack, a message authentication code (MAC) may be appended to all messages containing transaction data. The key needed for generating such a code may be part of the pairing data exchanged with the relay device 202 during the pairing procedure.

Furthermore, in one or more embodiments, the NFC controller 208 of the relay device 202 is arranged to send waiting-time extension requests to the NFC-enabled device 212 (i.e., the contactless reader). This is useful because it may prevent that timing requirements are not met. Whenever the contactless reader 212 sends an ISO 14443 contactless card command to the NFC controller 208 in the relay device 202, this command has to be relayed via the Bluetooth communication channel and the NFC controller 226 in the wireless device 216 to the secure element 220. Some of these commands are very timing-critical, while others are not. Most notably, the initial discovery and anti-collision phase of the ISO 14443 communication set-up has very strict timing requirements. While later on, when the contactless reader 212 starts sending ISO 7816-4 card reader commands over ISO 14443 there is a waiting-time extension (WTX) mechanism to delay responses from the secure element 220. In order to satisfy the timing requirements for the initial ISO 14443 communication set-up, the same procedure may be used as is used for HCE. As mentioned above, in the case of HCE, a secure element (also referred to as a "contactless card") is emulated by an application (app) executed on a wireless device, while its NFC controller takes care of the communication set-up. Similarly, the NFC controller 208 in the relay device 202 may use a so-called Random ID and use that during the anti-collision phase of the ISO 14443 protocol. Only when the contactless reader 212 has actually selected the Random ID and starts sending card-specific commands, then these would be relayed to the secure element 220 of the wireless device 216. Whenever the contactless reader 212 sends such a command, which has the form of an ISO 7816-4 application protocol data unit (APDU) command inside an ISO 14443 protocol message, the NFC controller 208 in the relay device 202 would respond with a WTX request to the contactless reader 212, while passing on the reader command to the wireless device 216. As long as it has not received a response back from the secure element 220 of the wireless device 216, the NFC controller 208 of the relay device 202 would keep sending WTX requests when the time runs out. In this way, the communication is kept going, while the ISO 14443 communication is not interrupted by the possible delay introduced by the exchange of messages between the relay device 202 and the wireless device 216 over the wireless communication channel.

Figure 3:
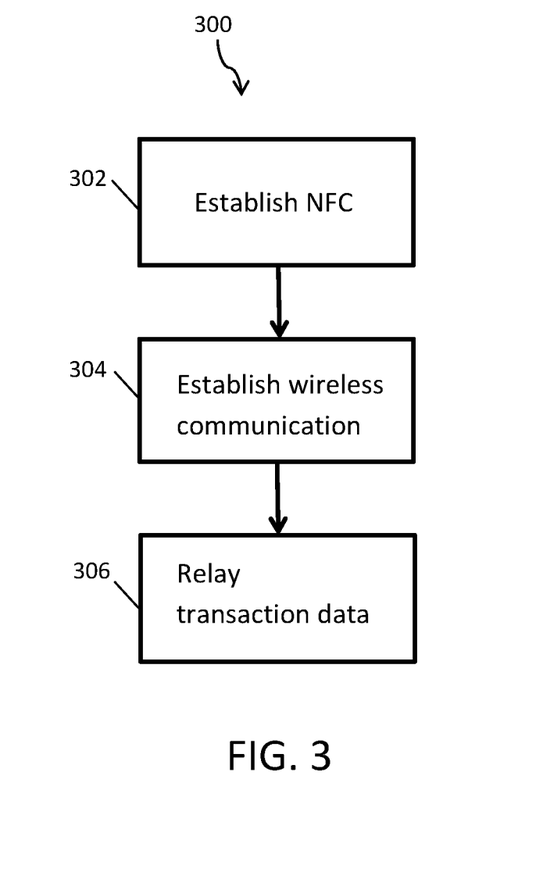
FIG. 3 shows an illustrative embodiment of a method for facilitating NFC transactions.

FIG. 3 shows an illustrative embodiment of a method 300 for facilitating NFC transactions. The method 300 comprises, at 302, establishing, by the combo device 206 in the relay device 202, near field communication with the contactless reader 212 through the NFC controller 208; at 304, establishing, by said combo device 206, wireless communication with the wireless device 216 through the wireless communication controller 210; and at 306, relaying, by the combo device 206, transaction data between the contactless reader 212 and the wireless device 216. These steps may be controlled and/or implemented at least partially by a computer program, comprising instructions which may be executed by the NFC controller 208 and/or the wireless communication controller 210.

Although, in the above-described embodiments, the wireless communication channel is a Bluetooth communication channel, it should be understood that the present disclosure is not limited thereto. That is to say, the skilled person will appreciate that other types of wireless communication may also be used, for instance Wi-Fi and ZigBee. In those cases, the combo devices 206 and 222 should comprise a wireless communication controller in accordance with the selected communication type.

Furthermore, in the above-described examples the communication unit of the relay device and the further communication unit of the wireless device are so-called combo ICs, i.e. single integrated circuits containing both an NFC controller and a wireless communication controller. Combo ICs may effectively support the isolation of the physical interface between the NFC controller and the wireless communication controller from other components of said relay device and wireless device. However, it is noted that the present disclosure is not limited thereto. Alternatively, but without limitation, the communication unit may be a so-called System-in-Package (SiP) containing interconnected controller ICs integrated in a single package, or the communication unit may be a single daughterboard having interconnected controller ICs mounted thereon, wherein the daughterboard is separate from the motherboard on which other components are mounted. The skilled person will appreciate that such structures may also sufficiently support the isolation of said physical interface.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 transaction system
102 contactless reader
104 NFC device
106 mobile device
108 application processor
110 NFC device
112 secure element
200 transaction system
202 wearable device
204 application processor
206 combo device
208 NFC controller
210 Bluetooth communication controller
212 contactless reader
214 NFC device
216 mobile device
218 application processor
220 secure element
222 combo device
224 Bluetooth communication controller
226 NFC controller
300 method for facilitating NFC transactions
302 establish NFC
304 establish wireless communication
306 relay transaction data

The invention claimed is:

1. A relay device for use in near field communication (NFC) transactions, comprising a communication unit,
wherein the communication unit comprises an NFC controller and a wireless communication controller which are operatively connected to each other through a physical interface, the NFC controller being arranged to establish communication with an external NFC-enabled device, and the wireless communication controller being arranged to establish communication with an external wireless device,
wherein the communication unit is arranged to relay transaction data between the external NFC-enabled device and the external wireless device,
wherein the physical interface between the NFC controller and the wireless communication controller is isolated from other components of the relay device such that an isolated communication channel is established for an exchange of transaction data to prevent the other components of the relay device from accessing the physical interface between the NFC controller and the wireless communication controller.

2. The relay device as claimed in claim 1, wherein the communication unit is a single integrated circuit comprising the NFC controller and the wireless communication controller.

3. The relay device as claimed in claim 1, wherein the wireless communication controller is a Bluetooth communication controller.

4. The relay device as claimed in claim 1, further comprising an authentication module for authenticating the relay device to the wireless device.

5. The relay device as claimed in claim 1, being arranged to exchange authentication credentials with the wireless device through the NFC controller.

6. The relay device as claimed in claim 1, further being arranged to add an authentication code to the transaction data.

7. The relay device as claimed in claim 1, wherein the NFC controller is arranged to send waiting-time extension requests to the NFC-enabled device.

8. The relay device as claimed in claim 1, being at least one of a wearable device and a smart watch.

9. A transaction system comprising the relay device as claimed in claim 1 and the external wireless device.

10. The system as claimed in claim 9, wherein the external wireless device comprises a secure element for storing and processing the transaction data.

11. The system as claimed in claim 10, wherein the external wireless device comprises a further communication unit, the further communication unit comprising a further NFC controller which is operatively connected to the secure element, and a further wireless communication controller which is operatively connected to the further NFC controller.

12. The system as claimed in claim 11, wherein the external wireless device is arranged to exchange authentication credentials with the relay device through the further NFC controller.

13. A method for facilitating near field communication (NFC) transactions, comprising:
establishing, by a communication unit in a relay device, communication with an external NFC-enabled device through an NFC controller comprised in the communication unit;
establishing, by the communication unit, communication with an external wireless device through a wireless communication controller comprised in the communication unit, wherein the wireless communication controller is operatively connected to the NFC controller through a physical interface, wherein the communication unit is arranged to relay transaction data between the external NFC-enabled device and the external wireless device, wherein the physical interface between the NFC controller and the wireless communication controller is isolated from other components of the relay device such that an isolated communication channel is established for an exchange of transaction data to prevent the other components of the relay device from accessing the physical interface between the NFC controller and the wireless communication controller;

relaying, by the communication unit, transaction data between the external NFC-enabled device and the external wireless device.

14. A computer program product embodied in a non-transitory, computer-readable storage medium, the computer program product comprising instructions which, when being executed by a hardware processor, cause the hardware processor to carry out or control the method as claimed in claim 13.

* * * * *